June 12, 1928.  1,673,075
H. B. HOWARD
SAW
Filed Dec. 10, 1924  4 Sheets-Sheet 1
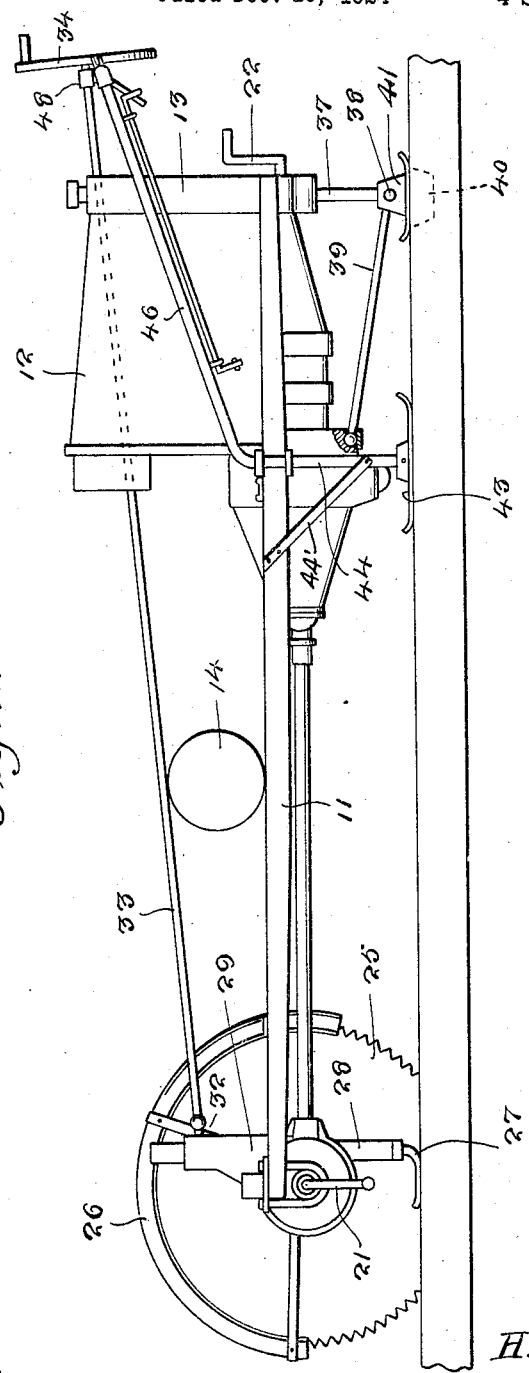

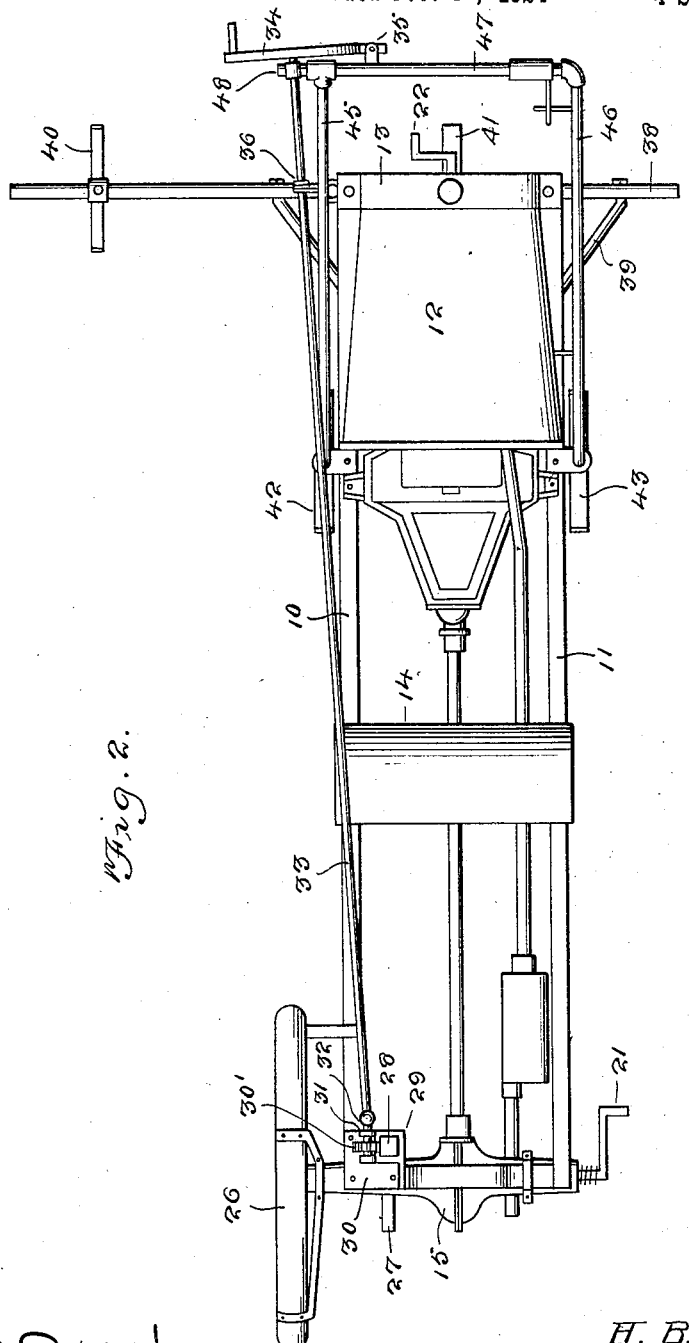

June 12, 1928.  
H. B. HOWARD  
SAW  
Filed Dec. 10, 1924
1,673,075
4 Sheets-Sheet 3
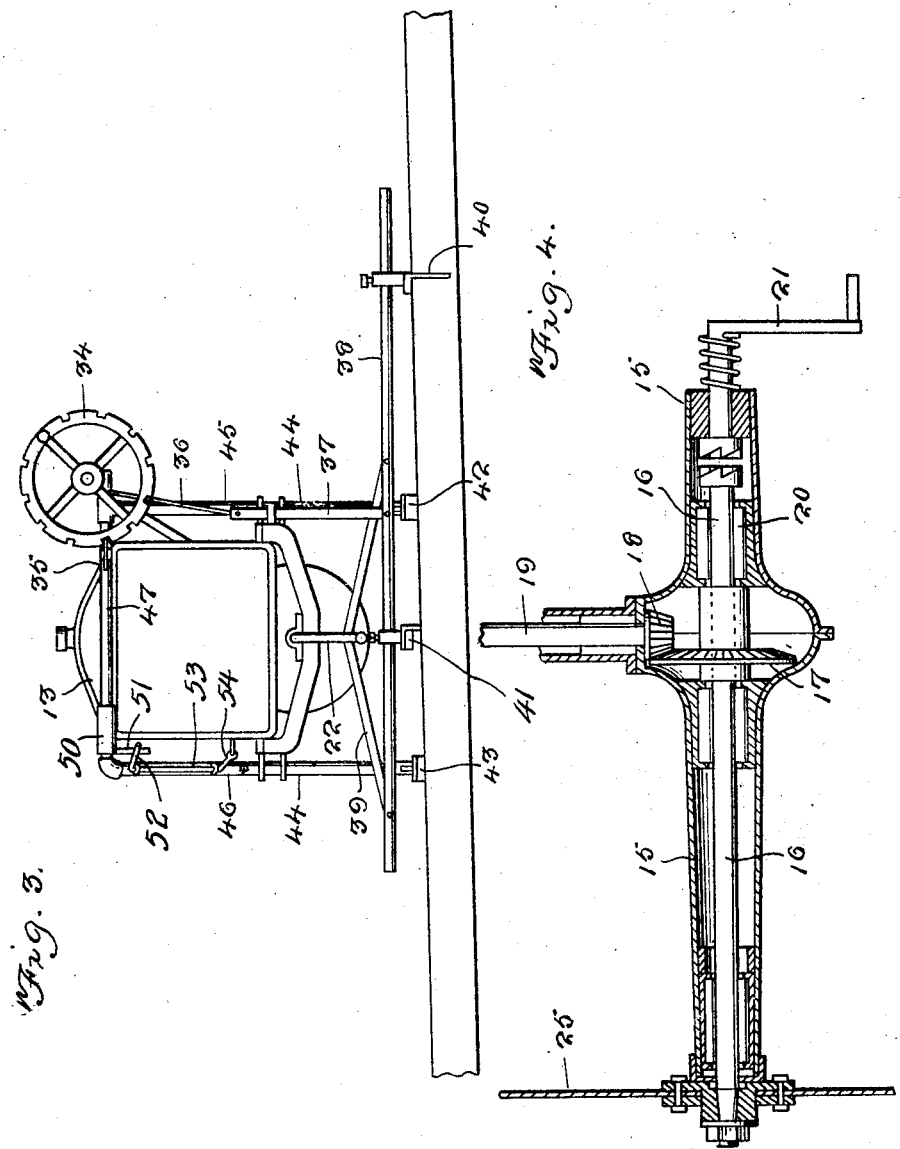
H. B. Howard  
INVENTOR  
BY Victor J. Evans  
ATTORNEY

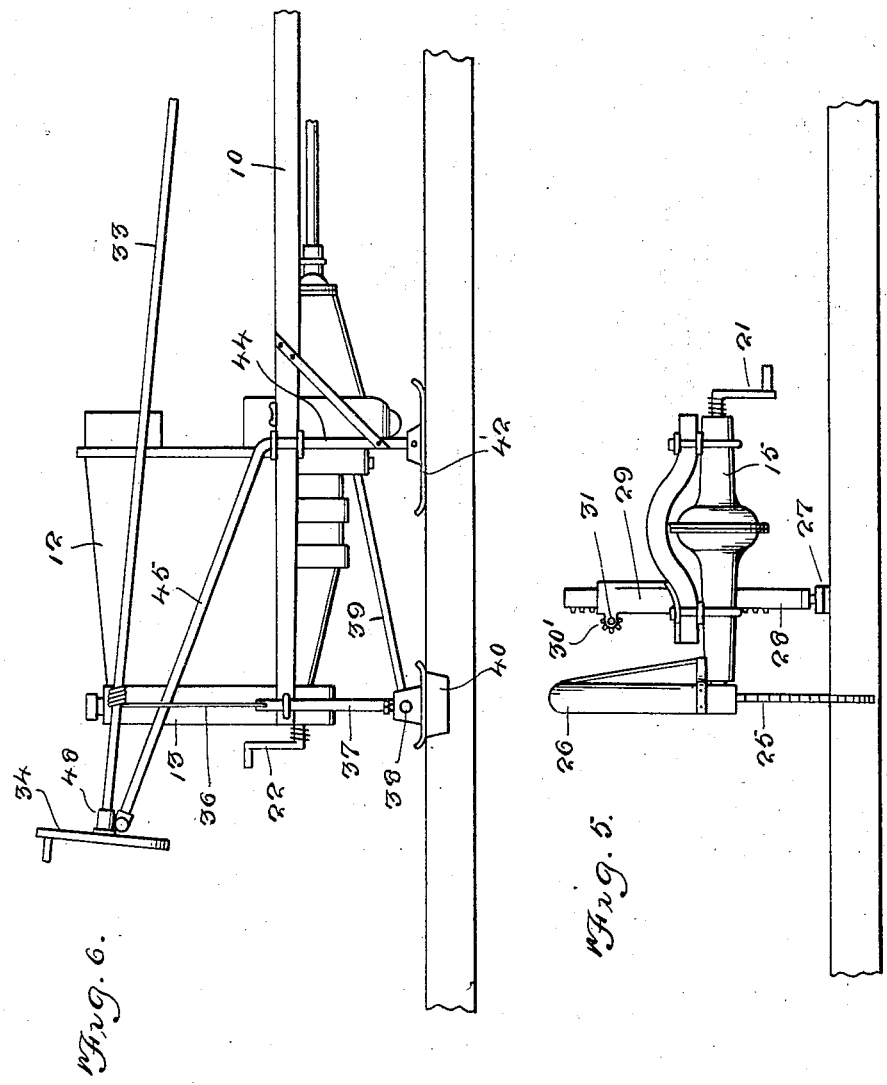

Patented June 12, 1928.

1,673,075

UNITED STATES PATENT OFFICE.

HAROLD B. HOWARD, OF BOUCKVILLE, NEW YORK.

SAW.

Application filed December 10, 1924. Serial No. 755,084.

The object of this invention is to build a machine including certain features of standard automobile construction,—the mechanism being designed for cutting ice by mounting a saw on a shaft in the rear axle housing, and providing special engine control, special guiding means, supporting means including runners, and means for changing the vertical position of the saw and guiding or gaging means, with reference to the surface of the ice.

A further object is to provide for mounting all controlling devices adjacent to a given point on the machine, in order to facilitate the handling of the device as a whole.

With the foregoing and other objects in view, the invention consists in the novel construction and arrangement of elements described illustrated and claimed, it being understood that modifications may be made within the scope of the claims without departing from the spirit of the invention.

In the accompanying drawings,

Figure 1 is a view of the machine in side elevation;

Figure 2 is a top plan view;

Figure 3 is an end elevation;

Figure 4 is a longitudinal section through the housing of the transverse shaft mounting the saw;

Figure 5 is an elevation showing especially the means for changing the vertical position of the saw, and also showing the saw guard and the housing of the transverse shaft;

Figure 6 shows a portion of the machine in side elevation, including means for controlling a guide or gage.

The frame includes the side members 10 and 11, the frame being of standard motor car construction, and the engine 12 being of the type usually employed on a standard make of car. A radiator is shown at 13 and a fuel tank at 14. A housing 15 usually inclosing the rear axle, receives in the present instance a transverse shaft 16 mounting a gear wheel 17 driven by pinion 18 on shaft 19 driven indirectly by the engine. Shaft 16 is mounted in the usual bearings 20 within housing 15, and one end of the shaft may be engaged by a spring held crank 21, normally in inoperative position, but capable of being used for cranking purposes instead of or simultaneously with the usual crank 22 at the front of the engine.

The saw 25 is mounted on the opposite end of shaft 16, in any suitable manner, but the regular wheel hub may be employed in this connection. The saw is protected by guard 26. In order to change the vertical position of the saw with reference to the surface of the ice, I employ a runner 27 carried by bar 28 operating in a vertical guide 29 which may be secured at 30. Element 28 includes teeth constituting a rack bar designed to mesh with pinion 30' mounted at 31 on short shaft 32 controlled by the long shaft or rod 33. The latter carries at its extreme end a wheel 34 adapted for hand control and retained in an adjusted position by latch or engaging device 35.

Wound on shaft 33 is a chain or other flexible device which raises a guide or gage when hand wheel 34 is rotated for raising the saw. The flexible device is designated 36 and is connected with vertical bar 37 connected with a transverse bar 38 mounted on wishbone 39 fastened to the base of the engine.

Bar 38 carries two runners or guide shoes 40, 41, with blades extending downwardly and adapted to follow the marks or cuts made by the saw on previous trips. One shoe follows the adjacent cut, when the machine is travelling in one direction, and the other shoe follows the adjacent cut on the return trip. The shoe not in use as a guide at a given time rides over the surface of the ice, the lower edge serving as a runner. These shoes are adjustable on bar 38 and are held by suitable retaining devices, and are spaced at equal distances, laterally, with reference to a point in front of the saw. This distance determines the width or length of the blocks of ice being cut.

The front runners 42, 43 support the main frame, through the vertical elements 44, to which they are pivoted or hinged. These hinges form a fulcrum with reference to which the frame is tilted in raising or lowering the saw.

Elements 44 are rigidly fastened or braced, being connected with the frame above the runners, by elements 44', and members 44 extend forwardly as bars 45, 46 and are connected by transverse bar 47, forming together a bail handle by means of which the machine is moved about on the ice. Transverse member 47 mounts a bracket 48 forming a bearing for shaft 33. The rear runner 27 is mounted to caster in bar 28, and as the other runners bear on the surface of the ice, the machine may readily be turned or caused to travel in the direction desired by the operator.

A sleeve 50 on element 47 of the bail handle constitutes a hand grip and carries an arm 51 engaging crank arm 52 on rod 53 having a crank 54 on its opposite end for controlling the fuel inlet valve of the engine.

An efficient motor driven saw for ice cutting may thus be constructed from standard equipment with the addition of a moderate amount of special material.

What I claim is:

1. In a device of the class described, a frame, a saw rotatably mounted therein, driving means for the saw, means for elevating the frame adjacent to the saw, runners mounted near the forward end of the frame, vertical elements mounting the runners, a bail-shaped device formed with the vertical elements, means for gaging the width of the ice to be cut, and means mounted on the bail for controlling the gaging means, said means last named including a shaft extending the length of the frame and rotating an element of the elevating means, a device for rotating the shaft, and a flexible device wound on the shaft and connected with the gaging means.

2. In a device of the class described, a frame, a saw rotatably mounted in the frame, means including an engine for driving the saw, a member for operating a fuel inlet element on the engine, a rotatable rod for controlling said member, a handle for guiding the frame, the rod being mounted on one member of the handle, a sleeve loose on another member of the handle, a radial arm on the sleeve, and an offset element on the end of the rod and freely rotated by said radial arm.

In testimony whereof I affix my signature.

HAROLD B. HOWARD.